INVENTOR
W. M. GOODALL
BY Alan C. Rose
ATTORNEY

Nov. 24, 1959     W. M. GOODALL     2,914,249
MICROWAVE DATA PROCESSING CIRCUITS
Filed Oct. 31, 1956     6 Sheets-Sheet 2
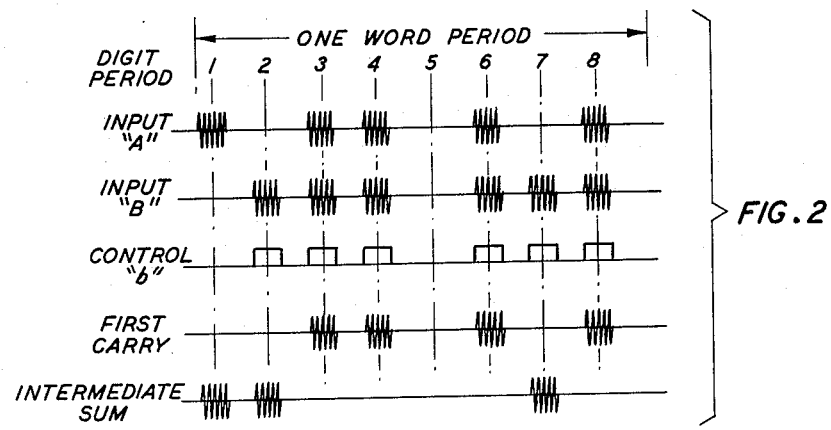
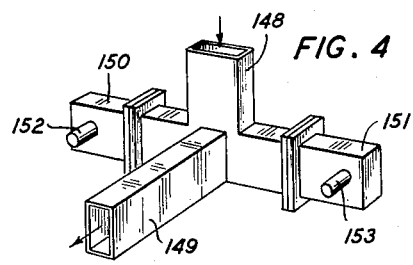
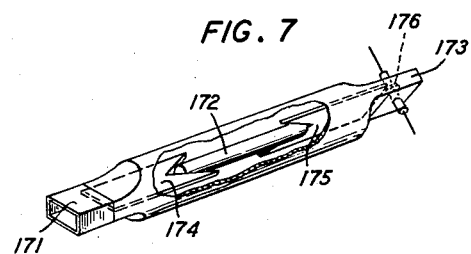
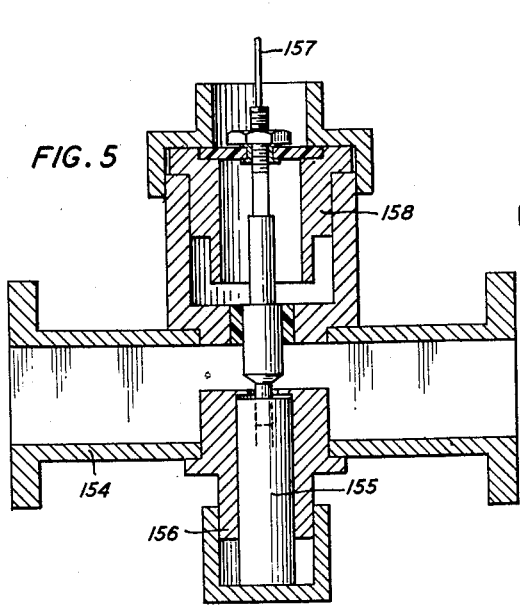
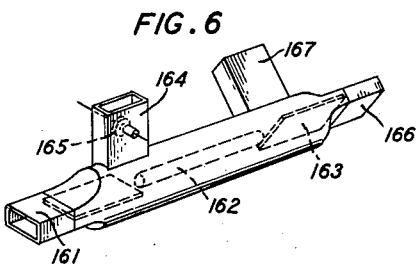
INVENTOR
W. M. GOODALL
BY
ATTORNEY

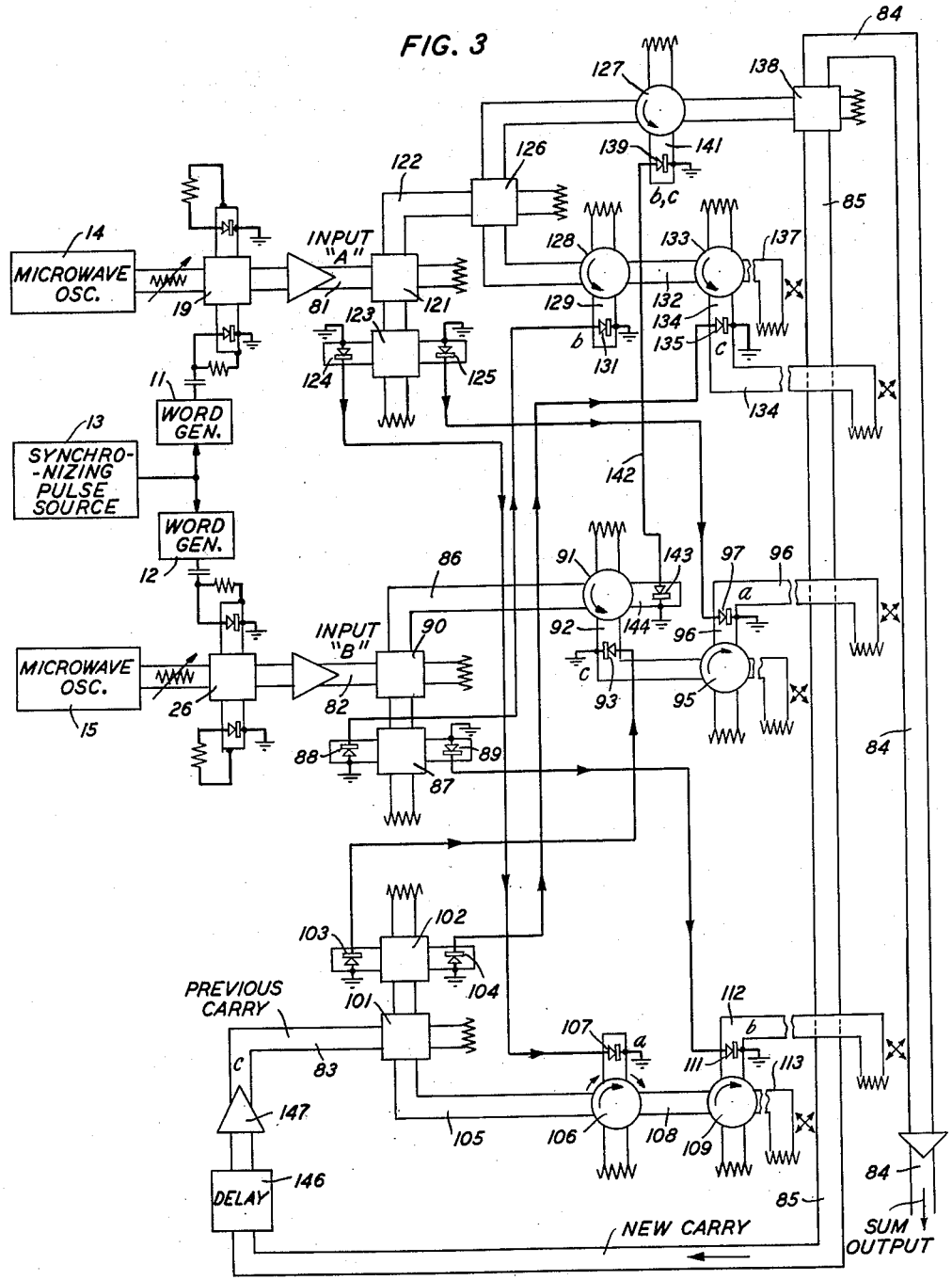

Nov. 24, 1959  W. M. GOODALL  2,914,249
MICROWAVE DATA PROCESSING CIRCUITS
Filed Oct. 31, 1956  6 Sheets-Sheet 4

INVENTOR
W. M. GOODALL
BY
Alan C. Rose
ATTORNEY

Nov. 24, 1959   W. M. GOODALL   2,914,249
MICROWAVE DATA PROCESSING CIRCUITS
Filed Oct. 31, 1956   6 Sheets-Sheet 5

INVENTOR
W. M. GOODALL
BY Alan C. Rose
ATTORNEY

Nov. 24, 1959 W. M. GOODALL 2,914,249
MICROWAVE DATA PROCESSING CIRCUITS
Filed Oct. 31, 1956 6 Sheets-Sheet 6
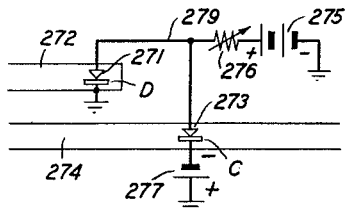
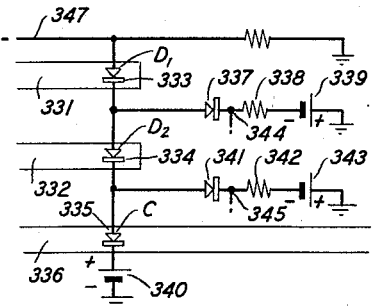
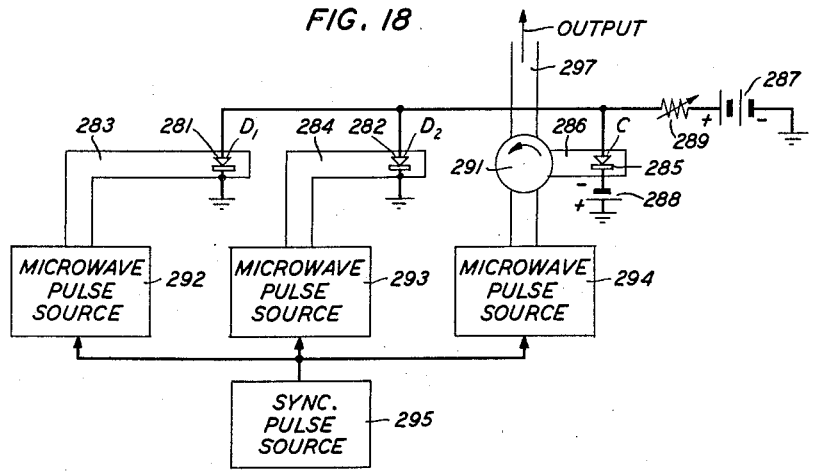
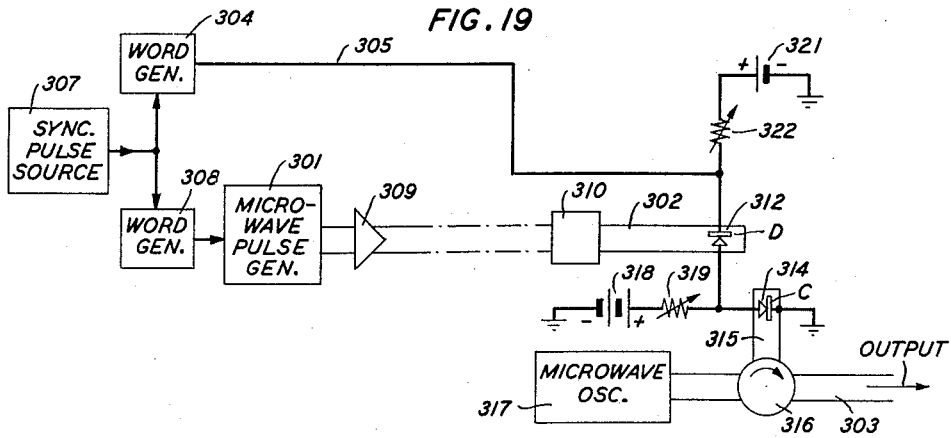
INVENTOR
W. M. GOODALL
BY Alan C. Rose
ATTORNEY

United States Patent Office 2,914,249
Patented Nov. 24, 1959

2,914,249

MICROWAVE DATA PROCESSING CIRCUITS

William M. Goodall, Holmdel, N.J., assignor to Bell Telephone Laboratories, Incorporated, New York, N.Y., a corporation of New York Application October 31, 1956, Serial No. 619,435

32 Claims. (Cl. 235—176)

This invention relates to high speed digital data processing or computer circuits.

In digital computers, it has been customary to use trains of direct current pulses to represent numbers. This is satisfactory at lower frequencies, and reliable computers have been built having digital pulse repetition rates of 4,000,000 pulses per second. At digital pulse repetition rates of 50,000,000 or 100,000,000 pulses per second, however, it is exceedingly difficult to build a reliable computer using prior art techniques. These difficulties are caused in part by the lack of a pulse amplifier having sufficient bandwidth to amplify "direct current" pulses at these pulse repetition rates, and also by the relatively slow speed of other conventional computer components.

Accordingly, the principal object of the present invention is to increase the speed of operation of digital computers.

In accordance with the principles of the invention, the foregoing object may be achieved by employing microwave energy to represent binary signals. A series of binary digits may be represented by a pulse train in which each pulse is a burst of electromagnetic wave energy. Thus, for specific example, a carrier frequency of from five to twelve kilomegacycles may be used with a computer operating at digital repetition rates of 50,000,000 to 100,000,000 pulses per second. Distributed amplifiers such as traveling wave tubes can effectively amplify pulses in the five to twelve kilomegacycle frequency band, and close spaced triodes are operative for amplification purposes at the lower end of this band. Wave guide branching circuits may also be provided for performing various switching functions with two or more trains of synchronized microwave pulses.

In accordance with the basic principles of the present invention the outputs of two microwave oscillators are respectively modulated by two synchronized direct current digital signal-generating circuits. In this manner synchronized digital microwave signals are presented on two separate channels. Such signals may be thereafter combined in microwave switching or logic circuitry to produce desired output signals.

In accordance with one aspect of the invention, wave guide switching components having an asymmetrically conducting device in at least one of the branch wave guides are employed to perform computer logic functions. For example, a hybrid junction may interconnect an input wave guide, an output wave guide, and a pair of control wave guides. A diode is located in each of the control wave guides. Binary pulses of microwave energy are applied to the input wave guide, and this energy divides equally between the two control wave guides. When the diodes in the control wave guides have the same impedance, equal amounts of energy are reflected in phase to the junction, and none of the energy is transmitted to the output wave guide. When detected unidirectional pulses from another synchronized source of microwave pulses are applied to change the impedance state of one of the diodes, however, unequal amounts of energy are reflected back from the diodes to the junction. A signal is then produced at the output wave guide.

In the foregoing paragraph, a circuit for determining the coincidence of two microwave pulses was described. Such a circuit is often termed and "And" circuit in compulter parlance because the energization of a first input circuit and a second input circuit is required to produce an output signal. Wave guide hybrid junctions including asymmetrically conducting devices may also be employed to provide other logic functions, as described in detail hereinafter. In addition, wave guide branching circuits other than hybrids may be employed with diodes to produce high speed switching circuitry.

A feature of the present invention is a microwave data processing circuit including first and second microwave channels for carrying digital information, the channels including first and second control circuits respectively, circuitry for applying microwave energy to each of the first and second channels, a first circuit for generating pulses representing digital signals, a second circuit for generating pulses representing digital signals, and a circuit for synchronizing the first and second pulse-generating circuits, the first and second pulse-generating circuits being respectively coupled to the first and second control circuits, whereby the impedance levels of the first and second control circuits are respectively varied in accordance with the outputs of the first and second pulse-generating circuits, thereby to modulate in synchronism the outputs of the first and second microwave-applying circuitry.

It is another feature of this invention that a first source of binary microwave signals may be controlled by a wave guide switching circuit in which the state of diodes associated with the switching circuit is determined by a second source of binary microwave signals.

It is another feature of this invention that detection diodes are located respectively in two wave guides and are connected to apply unidirectional control signals to a diode located in a third wave guide.

In accordance with still another feature of the invention, two sources of microwave coded digital information are connected to two microwave channels, and microwave switching components are coupled to the microwave channels to respond to respectively different combinations of input digital information.

It is a further feature of this invention that a control diode be located in a microwave channel or wave guide and control the transmission of microwave logic signals through the channel under control of its impedance state which is determined in accordance with the impedance state of one or more detection diodes electrically connected thereto, logic signals being applied to circuits including the detection diodes to determine their impedance states. More specifically in accordance with this invention various logical configurations may be attained depending on the poling of the detection and control diodes, their electrical connections, and the types of circuits, microwave or otherwise, in which the detection diodes are located.

One advantage of the diode control circuits of the present invention lies in the isolation of the various input microwave circuits. By employing unidirectional detected pulses for control purposes, undesired coupling between the microwave circuits can be readily avoided.

Other objects, features, and advantages of the invention may be readily apprehended from the following detailed description of certain illustrative embodiments of the invention, and from the drawings, in which:

Fig. 2 is a diagram of electrical wave forms at various points in the circuit of Fig. 1;

Fig. 3 depicts another microwave computer circuit illustrative of another embodiment of this invention;

Fig. 4 shows a conventional hybrid junction and associated crystals which is used as a component of the circuit of Fig. 1;

Fig. 5 is a detailed showing of a crystal holder which may be employed in the diode logic circuits shown in other figures of the drawings;

Fig. 6 represents a branching wave guide component which employs ferrite material to obtain nonreciprocal effects and which is termed a "circulator";

Fig. 7 shows another nonreciprocal microwave component which may be employed in the circuit of Fig. 1;

Figure 14:
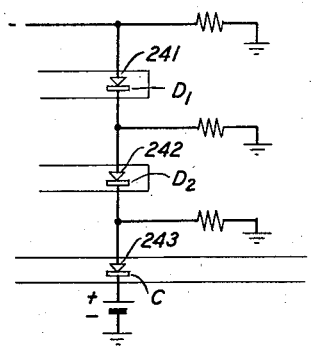
Figure 15:
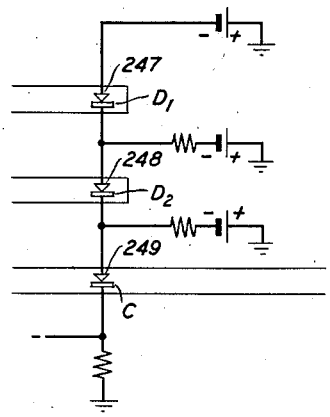
Figure 16:
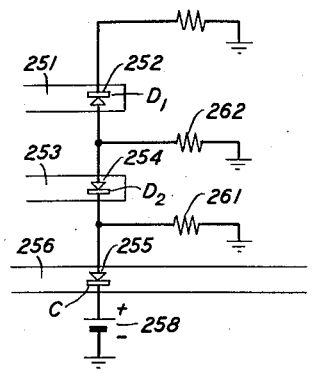

In Fig. 14 input signals from two sources of microwave control pulses and from one source of direct current pulses are employed to control the state of an additional diode;

Fig. 15 illustrates another circuit in which the impedance of a control diode is determined by the combined effect of pulses from two detection diodes and from a source of direct current pulses;

Fig. 16 shows a microwave inhibit circuit in which two detection diodes are poled in opposite directions;

Fig. 17 shows a diode control circuit in which the detection and control diodes are connected in parallel;

Fig. 18 illustrates a switching circuit in which switching action is obtained by controlling the impedance of a control diode in accordance with microwave pulses received at two other diodes which are connected in parallel with the control diode;

Fig. 19 shows a pulse regeneration circuit in accordance with the invention; and Fig. 20 illustrates a relatively complex microwave control circuit in which direct current pulses are applied to diodes which are in turn connected to direct current control circuits in an arrangement similar to that shown in Fig. 15.

Figure 1:
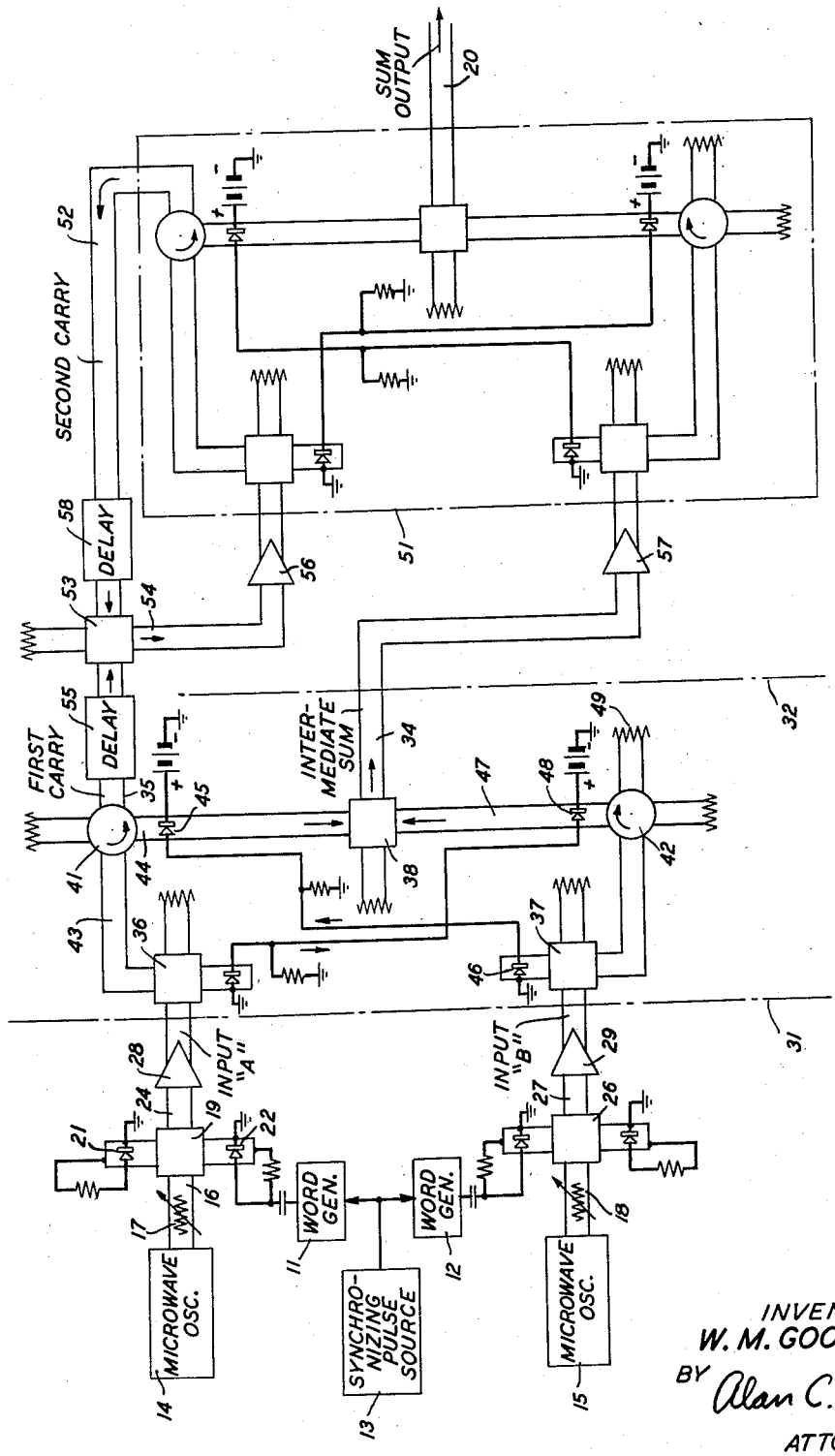
Fig. 1 shows a microwave computer circuit in accordance with one specific illustrative embodiment of the invention.

With reference to the drawings, Fig. 1 shows, by way of example, a microwave adder circuit. From an overall standpoint, the circuit of Fig. 1 adds two binary numbers which are supplied by the word generation circuits 11 and 12, and produces binary output signals at the wave guide output circuit 20. One significant feature of the circuit of Fig. 1 is the high pulse repetition rate which is employed. For example, binary input signals may be processed and a sum output produced at pulse repetition rates of from 50,000,000 to 100,000,000 digits per second.

In serial binary computers, numbers and characteristically represented in terms of a series of pulses. In general, a series of time slots are established and a pulse is either transmitted in a particular time slot or no pulse is transmitted. The presence of a pulse in a particular time slot or digit period corresponds to the binary symbol "1," and the absence of a pulse corresponds to the binary symbol "0." The pulses representing a single number appear consecutively during a time interval which is normally designated a "word period." In the diagram of Fig. 2, it is assumed that each word period includes eight binary digits. The elapsed time between the successive time slots in which pulses may or may not appear is termed a "digit period." In the diagram of Fig. 2, eight numbered digit periods are designated. A series of modulated pulses designated "input A" appears in the first pulse pattern of Fig. 2. Input A includes pulses in digit periods 1, 3, 4, 6, and 8. Accordingly, the binary number represented by the pulse pattern of input A is 10110101.

With the foregoing background, the circuit of Fig. 1 may be considered in detail. In addition to the word generation circuits 11 and 12, the pulse generation circuitry includes the synchronizing pulse source 13 and the oscillators 14 and 15. The oscillators 14 and 15 may, for example, be klystron oscillators, and may supply output microwaves in the frequency range of about five to twelve kilomegacycles to the wave guides 16 and 18, respectively. The output signal in wave guide 16 is adjusted to a suitable level by a variable microwave attenuator element 17. The microwave energy is then applied to a hybrid junction 19. The hybrid junction 19 may, for example, be a wave guide structure such as that shown in Fig. 12.4–7 on page 643 of a text entitled "Principles and Applications of Wave Guide Transmission" by George C. Southworth, D. Van Nostrand Co., Inc., New York, 1950. A simplified diagram of such a hybrid junction appears in Fig. 4 of the present drawings. Other known types of hybrid junctions such as those mentioned in C. C. Cutler Patent 2,652,541 granted September 15, 1953, may also be employed. When the crystals 21 and 22 of the hybrid junction 19 have the same bias, microwave energy is reflected to the hybrid junction in equal amounts, and with the same phase, and therefore no energy is transmitted to the output wave guide 24. When biasing pulses are provided from the word generator 11, however, the impedance of the diode 22 is changed with respect to that of diode 21. Under these circumstances, unequal amounts of energy are reflected back toward the hybrid junction, and a significant output appears at wave guide 24. The bursts of microwave energy which appear at wave guide 24 are shown in the pulse train designated input A in Fig. 2.

The hybrid junction 26 and its associated crystals operate in the same manner as the hybrid junction assembly 19 to modulate the output of the klystron oscillator 15 in accordance with signals from the word generator 12. Signals such as those designated input B in Fig. 2 accordingly appear at the output 27 from the hybrid junction 26. Amplifiers 28 and 29 are inserted in the wave guides 24 and 27, respectively. These amplifiers may be close spaced triodes, or distributed type amplifiers, such as traveling wave tubes, which have relatively broadband amplification properties.

Starting with the radio frequency pulses at inputs A and B at the outputs of the amplifiers 28 and 29, the microwave circuitry required for binary addition of the signals will now be considered. Initially, it is helpful to consider the definitive specification of a half-adder as set forth in Table I.

*Table I*

DEFINITIVE SPECIFICATION OF A HALF-ADDER

| Input A | Input B | Intermediate Sum | First Carry |
|---|---|---|---|
| 0 | 0 | 0 | 0 |
| 0 | 1 | 1 | 0 |
| 1 | 0 | 1 | 0 |
| 1 | 1 | 0 | 1 |

Referring to Fig. 1, the adder circuitry appears to the right of the vertical dash-dot line 31. It includes a first half-adder which is included between line 31 and the second dash-dot line 32, and a second half-adder which appears to the right of line 32.

The first half-adder of Fig. 1 which appears between lines 31 and 32 will now be correlated with the definitive specification or "truth table" of a half-adder which appears in Table I. In particular, it may be noted that the intermediate sum output appears on wave guide 34, and that the first carry appears at wave guide 35. Referring to Table I, it may be seen that no pulses should appear at wave guides 34 or 35 when there are no input pulses applied at inputs A or B. When a pulse is present on only input A or input B but not on both input wave guides, an output pulse should appear on the intermediate sum output wave guide 34, but not on the carry output wave guide 35. Similarly, when both input wave guides A and B are energized, a carry output signal should appear at wave guide 35, but not output signal should be present at wave guide 34.

The foregoing mode of operation is instrumented by the hybrid junctions 36, 37, and 38 and by the circulators 41 and 42. By cross-connecting the diodes in the hybrids and circulators in the two wave guide transmission paths, the desired mode of operation may be obtained.

Before proceeding with the description of Fig. 1, the properties of circulators such as those indicated at 41 and 42 should be set forth. A circulator is a wave guide branching circuit having three or more interconnected wave guides. When signals are applied to a first input wave guide, they are transmitted to the second wave guide. Signals applied to the second wave guide are transmitted to the third wave guide, and so forth. Thus, instead of the normal reciprocal input and output relationships expected in a passive electrical circuit, a nonreciprocal effect is observed in which input signals are circulated to successive output circuits. A typical circulator is shown in Fig. 6 of the drawings, and reference will be made to articles disclosing such components in detail in the course of the description of Fig. 6.

Returning to a consideration of circulator 41 in Fig. 1, signals applied to it on input wave guide 43 appear at wave guide 44. Similarly, signals reflected from wave guide 44 toward the circulator 41 appear at the first carry wave guide 35. The diode 45 in wave guide 44 is biased in the reverse direction when no signal is applied to it from the crystal 46 associated with hybrid 37. Thus, for example, when input A is energized and no pulse is applied to input B, a pulse will be transmitted from hybrid 36 to wave guide 43, through the circulator 41 to the branch wave guide 44, and through the hybrid 38 to the intermediate sum output 34. With crystal 45 in the high impedance state, no carry output signal is reflected toward circulator 41 to appear on the carry output wave guide 35. Suitable values of reverse and forward biasing for transmission and reflection, respectively, are set forth in connection with the description of Fig. 5. The operation of the circuit of Fig. 1 described above corresponds to row 3 in Table I, in which input A is "1" and input B is "0." Under these circumstances, the table indicates that the sum output should be "1" and the first carry output should be "0." From the foregoing analysis, we have seen that this is indeed the case, as no output pulse appears at wave guide 35, and wave guide 34 is energized.

Similarly, the validity of the other rows of the definitive specification set forth in Table I may be readily verified. For example, in row 1, the absence of input signals A and B produces the expected result of no output signals either on the intermediate sum wave guide or the first carry wave guide. When input B is present and input A is absent, the crystal 48 associated with the circulator 42 transmits the microwave pulse to wave guide 47, and it is transmitted through the hybrid 38 to the intermediate sum output wave guide 34.

When both inputs A and B are energized, crystals 45 and 48 associated with circulators 41 and 42, respectively, are biased by detected pulses to reflect energy back toward the circulators. In the case of circulator 41, the reflected energy from wave guide 44 is applied to the first carry output 35. In the case of circulator 42, the pulse reflected from wave guide 47 and crystal 48 is coupled to the resistive termination 49 associated with the next successive terminal of the circulator 42, where it is dissipated. Therefore, and in accordance with the final row of Table I, when both input wave guides are energized, a first carry output signal is produced on wave guide 35, and no energy appears on the intermediate sum output wave guide 34.

In considering the circuitry to the right of the dash-dot line 32, the circuitry in block 51 is another half-adder which is identical in all respects to the half-adder which has just been discussed. The carry produced on the carry output wave guide 52 from the half-adder 51 is the second carry. It is combined with the first carry in the hybrid junction 53. The resultant carry on wave guide 54 is then applied to the pulse regeneration circuit 56. The delay circuits 55 and 58 in the first and second carry circuits introduce sufficient delay so that the resultant carry appears at the half-adder circuit 51 in synchronism with the intermediate sum digit subsequent to the one which produced the carry in question. The intermediate sum output signal on wave guide 34 is also transmitted through an amplification circuit 57 before application to the second half-adder 51. The pulse train from the sum output wave guide 20 from the half-adder 51 represents the sum of the input binary numbers applied at inputs A and B. This number is in serial binary form and may be applied to the next successive arithmetic operation or may be applied to storage. If desired, the sum output wave guide 20 may be connected back to input A or input B by a circuit having a delay equal to a word period. With this arrangement, the adder of Fig. 1 is converted into an accumulator which stores a binary number and is capable of adding subsequent numbers which are applied on the other input circuit to the stored number.

The diagram of Fig. 2 has been mentioned above in connection with the inputs A and B. It may also be noted that the signals applied from crystal 46 to crystal 45 are indicated in the third row of pulses in Fig. 2. These pulses represent the rectified waveform of the pulses applied to input B. The fourth and fifth rows of pulses in Fig. 2 correspond to the first carry and the intermediate sum outputs, respectively, in Fig. 1. The four first carry pulses which are present in the word period shown in Fig. 2 are caused by the concurrent presence of microwave pulses applied at input A and the control pulses $b$. Similarly, the three intermediate sum pulses are caused by the presence of one, but not both, of the input signals A and B.

In Fig. 1, an adder circuit was described which employed two half-adders. In Table I, the definitive specification or "truth table" for each of the half-adders was set forth. It is also possible to instrument an addition circuit directly without the use of two half-adder circuits. The definitive specification for a full adder is set forth in Table II in terms of input A, input B, and the previous carry. The resultant sum output signal and the new carry are given in the right-hand columns of Table II.

*Table II*

DEFINITIVE SPECIFICATION OF A FULL ADDER

| Input A | Input B | Previous Carry | Sum | New Carry |
|---------|---------|----------------|-----|-----------|
| 0 | 0 | 0 | 0 | 0 |
| 0 | 0 | 1 | 1 | 0 |
| 0 | 1 | 0 | 1 | 0 |
| 1 | 0 | 0 | 1 | 0 |
| 1 | 1 | 0 | 0 | 1 |
| 0 | 1 | 1 | 0 | 1 |
| 1 | 0 | 1 | 0 | 1 |
| 1 | 1 | 1 | 1 | 1 |

The definitive specification or "truth table" set forth above may be instrumented as indicated in Fig. 3 of the drawings. In Fig. 3, the oscillator and word generation circuitry is identical with that described in connection with Fig. 1. Accordingly, the same reference numbers are used for the corresponding elements. From an over-all standpoint, the circuit of Fig. 3 has three signal inputs: input A on wave guide 81, input B on wave guide 82, and the previous carry signal on wave guide 83. In response to binary signals at these three inputs, appropriate output signals on the sum wave guide 84 and the new carry wave guide 85 are produced in accordance with Table II.

To start the description of Fig. 3 with a relatively simple circuit pattern, it will be assumed that a pulse is present on input B and that no pulses are present on input A or on wave guide 83 representing the previous carry. This corresponds to row 3 of Table II. Referring to the output columns of row 3 in Table II, it may be seen that a sum output pulse should be produced, but no carry pulse is to be expected.

The input signal B on wave guide 82 is initially applied to the hybrid junction 90. Energy applied to the hybrid junction 90 divides, with half being applied to wave guide 86 and the other half being transmitted to the hybrid junction 87. The hybrid junction 87 has two detection crystals 88 and 89 which are employed to develop control signals when signal B is present, and which are used for control functions which will be described hereinafter. The signal applied on wave guide 86 is transmitted to the circulator 91. The circulator 91 transmits the applied signal to wave guide 92. In the absence of control signals from the previous carry channel C applied to crystal 92, microwave signals are transmitted through wave guide 92 to the circulator 95. The circulator 95 transmits the applied signals to wave guide 96. In the absence of control signals from input A applied to crystal 97, pulses are transmitted along wave guide 96, and are coupled to the sum output wave guide 84.

In Fig. 3 the direct current biasing circuitry for the control diodes has been eliminated to reduce the complexity of the drawing. Typical biasing circuits will be described in detail in connection with Figs. 9, 10 and 11, and biasing requirements for switching action will be set forth in connection with the description of Fig. 5.

Continuing with the description of Fig. 3, when a single pulse is present on the previous carry wave guide 83 and no pulse is applied at inputs A and B, the circuitry associated with the previous carry input guide 83 operates substantially as described in the previous paragraph for input B. Thus, the hybrid junctions 101 and 102 perform substantially the same functions as the hybrid junctions 90 and 87, respectively, with control signals being developed at crystals 103 and 104 when the carry signal is present. The carry signal from the hybrid 101 is transmitted along wave guide 105 to circulator 106. In the absence of control signals applied to crystal 107 from input A, energy is reflected back toward the circulator 106. This energy is coupled to wave guide 108 and is applied to circulator 109. The crystal 111 associated with the output wave guide 112 from circulator 109 is biased to pass microwave signals when no biasing signal is applied to it from input B. Accordingly, with only the previous carry input 83 energized, an output signal is transmitted to the sum output 84, to the exclusion of the new carry output wave guide 85.

When both a previous carry signal and input B are present, the crystal 11 associated with circulator 109 is biased to an impedance state in which it reflects energy back to the circulator 109. The circulator then couples the microwave energy to wave guide 113, which is connected to the new carry wave guide 85. In addition, of course, no signal is applied to the sum output wave guide 84 from wave guide 112, in view of the impedance state of crystal 111. Similarly, diode 93 associated with circulator 91 is biased to the low resistance state by the detection diode 103 to reflect microwave energy back to circulator 91 and prevent the transmission of microwave energy from channel B to either the sum or new carry output wave guides. This mode of operation corresponds to that indicated in row 6 of Table II, in which only inputs B and the previous carry are energized, and in which the indicated outputs are "0" for the sum output and "1" for the new carry output.

Considering the case in which microwave signals are applied only to input A, the input pulse is transmitted to hybrid 121. In hybrid 121, the microwave energy is divided, with half being applied to wave guide 122 and the other half being applied to hybrid junction 123. Two control crystals 124 and 125 are associated with hybrid junction 123 to provide control signals when input A is present. Microwave energy on wave guide 122 is applied to hybrid junction 126 where it is divided, and one half of the energy is applied to each of circulators 127 and 128. Considering the portion of the energy applied to circulator 128, this energy is coupled to wave guide 129. The crystal 131 in the wave guide stub 129 is biased such that microwave energy will be reflected back from the end of the stub toward the circulator 128 in the absence of input signal B. The microwave energy is then transmitted through wave guide 132 to circulator 133. Circulator 133 couples the input microwave energy to wave guide 134. Crystal 135 in wave guide 134 is biased to pass pulses when it is not energized from a previous carry signal. Under these circumstances, wave guide energy is coupled to the sum output wave guide 84 by the wave guide 134. The function described above corresponds to that shown in row 4 of Table II.

If a previous carry signal is present, however, crystal 104 associated with hybrid junction 102 is energized and applies a control pulse to crystal 135. This changes the impedance state of crystal 135 so that it reflects microwave energy back to the circulator 133 where it is coupled to wave guide 137. Wave guide 137 in turn applies pulses to the new carry output wave guide 85. When microwave signal A and the previous carry signal are both present it is necessary to block the carry signals on wave guide 83 from the output wave guides 84 and 85. This is accomplished by applying control signals from crystal 124 associated with channel A to bias crystal 107 to absorb microwave signals from circulator 106. The foregoing description corresponds to the situation defined by row 7 of Table II. Referring to the right-hand columns of Table II, the absence of energization of the sum output and the expected energization of the next carry output is confirmed.

When all three inputs are energized, microwave energy from input A is coupled from hybrid 126 to circulator 127 to hybrid junction 138. The energy applied to junction 138 is coupled to both the sum output wave guide 84 and to the carry wave guide 85. This operation is controlled by crystal 139. Normally, crystal 139 is biased to absorb energy coupled to wave guide stub 141 by circulator 127. However, when a control signal is applied on lead 142 to crystal 139, its impedance state is changed so that energy is reflected back to the circulator 127. The detailed connections for crystals 139 and 143 may, for example, be as described hereinafter for the comparable crystals in Fig. 17. With this arrangement diode 139 is driven to the high impedance state and energy is reflected from the end of the wave guide stub 141 back to the circulator 127. In this event, of course, circulator 127 couples the microwave energy to the hybrid junction 138. Lead 142 is only energized when signals from input B and from the previous carry C are both present. This is a result of the operation of crystals 103, 93, and 143. Lead 142 is directly energized from crystal 143. However, signals are only applied to crystal 143 when both input B is present to apply microwave energy to circulator 91 and when input C is present to energize crystal 93 and reflect energy appearing in wave guide 92 back to the circulator 91. Under these circumstances, the microwave energy from input B is reflected around to the wave guide stub 144, where it is rectified by crystal 143. This has the effect of changing the impedance state of crystal 139, and causing the energization of both the sum wave guide 84 and the carry output wave guide 85, as mentioned above. Referring once more to Table II, the function described in this paragraph corresponds to the final row of the table, in which the energization of all of the inputs causes energization of the two outputs.

To complete the considerations of the case in which all three microwave inputs are present, the method of blocking the previous carry and the input B signals should be noted. Initially, the reflecting action of diode 93 in channel B in the presence of control signals from the carry channel has been noted above. To block the carry channel, the crystal 124 associated with channel A applies a direct current or unidirectional pulse to bias diode 107 to absorb microwave energy. Accordingly, no output signals can reach wave guides 84 and 85 from either channel B or the carry channel.

The case where only inputs A and B are present corresponds to row 5 of Table II. Noting the entries in the right-hand columns of Table II, it is to be expected that a new carry output signal will be produced on wave guide 85 but that no sum output signal will appear. From the the description of the case in which only input B is present, it may be recalled that diode 97 is normally in the high impedance state. When detected unidirectional pulses derived from channel A are applied to diode 97 from diode 125, diode 97 reflects microwave energy back to circulator 95. The energy reflected back to circulator 95 is coupled to the new carry wave guide 85 to the exclusion of the sum output wave guide 84.

Microwave energy on channel A is blocked from output wave guides 84 and 85 by diodes 131 and 139 associated with circulators 128 and 127, respectively. As mentioned above, diode 131 is normally biased such that energy is reflected back from the end of the stub 129 to circulator 128. When input B is present, however, unidirectional pulses from diode 88 associated with channel B bias diode 131 to the absorbing state, and no microwave energy is reflected back to circulator 128. The crystal 139 is biased to normally absorb microwave energy, and, in the absence of a detected pulse from diode 143, remains in this state. Accordingly, no microwave signals from channel A can reach output wave guides 84 or 85.

In the circuit of Fig. 3, a delay circuit 146 is indicated to represent the one digit period of delay required for traversing the carry loop. In actual practice, this additional delay is provided by adjusting the lengths of the wave guides 83 and 85 in the carry loop. It is also noted that the amplifier and pulse regenerator 147 will introduce about .005 microseconds of delay when a distributed amplifier such as a traveling wave tube is employed. Delays of this order of magnitude become significant when pulse repetition rates of more than 50,000,000 to 100,000,000 pulse per second are employed.

In Fig. 3 each of the circulators 133, 95, and 109 has one output coupled to the sum output wave guide 84 and another output coupled to the new carry wave guide 85. The directional couplers shown in Fig. 3 may be employed to effect each of the six required connections, in order to control the direction and level of microwave signal coupling. In Fig. 3 it may also be noted that each of the wave guides between the circulators 133, 95, and 109, and the wave guides 84 and 85 includes a break. This break indicates the inclusion of an additional length of wave guide required to equalize the delay of microwave pulses from input A, input B and the previous carry input to the point in each of wave guides 84 and 85 where the carry channel is coupled to the output wave guides. This arrangement produces properly timed output pulses from synchronized input pulses when any one of the paths through the circuit of Fig. 3 is followed.

Figs. 4 through 7 are included to indicate the physical structure of some of the components which may be employed in the microwave computer circuits of Figs. 1 and 3. In Figs. 4 through 7, Fig. 4 is a hybrid junction of the "magic T" type, Fig. 5 is a typical crystal mounting which may be employed, and Figs. 6 and 7 are a circulator and an isolator, respectively.

Fig. 4 is a simplified showing of a hybrid junction of the "magic T" type. In addition to the Southworth text mentioned above, hybrid circuits are shown and discussed in C. C. Cutler Patent 2,652,541, granted September 15, 1953. In Fig. 4, the "magic T" hybrid junction includes the input and output wave guides 148 and 149, respectively, and the two branch arms 150 and 151. The branch arms 150 and 151 include the crystal assemblies 152 and 153, respectively.

Microwave energy applied to input wave guide 148 divides, with one half being applied to each of wave guides 150 and 151. No microwave energy applied to either wave guide 148 or wave guide 149 is coupled directly to the other wave guide. The arms 148 and 149 are therefore said to be a pair of "conjugate" arms of the hybrid junction. A similar relationship exists between the conjugate arms 150 and 151 of the hybrid junction.

The energy applied to wave guide 148 is coupled to wave guides 150 and 151, and some of the energy may then be reflected back to the hybrid junction. If the energy reflected from the two branch arms is equal in phase and magnitude, it is coupled back to wave guide 148 to the exclusion of wave guide 149. If the microwave signals reflected from the two arms are one hundred and eighty degrees out of phase and of equal magnitude, all of the energy is coupled to output wave guide 149. If the signals reflected from arms 150 and 151 differ in magnitude, the excess energy of the stronger signal divides between wave guides 148 and 149, irrespective of the relative phases of the two signals. Therefore, when microwave signals of different input levels are coupled either separately or concurrently to one pair of conjugate arms of a hybrid junction, the presence of the first signal and/or the second signal always produces an output signal at both of the wave guides of the other pair of conjugate wave guides.

Fig. 5 is a detailed showing of a wave guide, a crystal, and a crystal holder which may be employed in the instrumentation of the control or detection diode components discussed above. Component parts of the structure of Fig. 5 include the wave guide 154, the crystal 155, the crystal holder 156, the direct current connection 157, and the microwave bypass condenser structure 158. For applications such as that indicated in Fig. 4, one end of the wave guide 154 may be closed with a conducting plate or a plunger.

The diode 155 may be a commercially available type 1N78 crystal. However, improved results are obtained with bombarded silicon diodes such as those disclosed in R. S. Ohl Patent 2,750,541, granted June 12, 1956. When the diode is to be employed as a switch, it passes or reflects energy in accordance with its impedance state. When a substantial forward bias is applied to the crystal, current flows in the crystal and it presents a low impedance. This low impedance across the wave guide reflects microwave energy applied to the crystal. When a reverse bias is applied, however, little or no current flows in the crystal, and it presents a high impedance. This high impedance across the wave guide allows electromagnetic waves to pass through the unit with little or no loss.

To indicate the general order of magnitude of the required forward and reverse biases, the following example is given. When a reverse bias of between three and five volts is applied to a crystal such as diode 155 in Fig. 5, the transmission loss is only about two or three decibels. With a forward bias sufficient to produce a current of about 100 milliamperes, the reflection loss is about six decibels. It should also be noted that with a somewhat lower forward bias the impedance of the diode may be adjusted to match the impedance of the wave guide and thus to absorb nearly all of the incident microwave energy.

Figs. 6 and 7 are drawings of nonreciprocal wave guide circuits which both rely on the Faraday effect in ferrite materials to obtain nonreciprocity. In the circulator of Fig. 6, microwave energy is applied to the rectangular input wave guide 161. The longitudinally magnetized cylinder of ferrite material 162 has the effect of rotating the plane of polarization of the input wave guide by 45 degrees. When the electric vector is rotated so that it is parallel to the metal septum 163, it is reffected back toward the central section of wave guide including the ferrite cylinder 162. In traversing the ferrite cylinder once more, the plane of polarization of the electromagnetic wave is rotated by an additional 45 degrees. With the electric vector of the transmitted signal now being oriented at an angle of 90 degrees with respect to its original position, it may no longer be accepted by the wave guide 161, and is in the proper plane of polarization to be accepted by the wave guide 164.

The crystal 165 in the wave guide 164 may be biased in the high impedance state so that the microwave energy is transmitted past the crystal 165 in accordance with the principles described above. When the crystal 165 is biased to the low impedance state, however, an impedance mismatch is presented, and energy is reflected back toward the circulator structure. Energy applied to the circulator from wave guide 164 is transmitted through the ferrite cylinder 162 and passes into the rectangular wave guide 166. Similarly, any energy applied to the circulator from the rectangular guide 166 traverses the ferrite cylinder twice and is coupled to the fourth rectangular wave guide 167. The rectangular wave guide 166 may also be provided with a crystal for control purposes. It is noted that W. W. Mumford, Patent 2,769,960, issued November 6, 1956, discloses a circuit which is somewhat similar to that shown in Fig. 6.

Fig. 7 shows an isolator structure which operates in much the same fashion as the circulator of Fig. 6. In Fig. 7 energy applied to input wave guide 171 is transmitted through the ferrite cylinder 172 and is rotated by 45 degrees so that it is accepted by the output wave guide 173. In each case, the plane of polarization of the electric vector is perpendicular to the plane of resistive vanes 174 and 175, which are located on either side of the ferrite cylinder 172, so that the forward-going electromagnetic waves are not substantially attenuated. A crystal 176 is located in the wave guide 173. When the crystal 176 is in the high impedance state, no energy is reflected back toward the isolator. When the diode 176 is biased in the forward direction, however, the electromagnetic energy is reflected back toward the isolator. In transmission from right to left, the plane of polarization of the electromagnetic waves is again rotated by 45 degrees, so that the electric vector is oriented parallel to the resistive vane 174. With this relationship between the electric vector and the resistive vane, the electromagnetic wave energy is substantially absorbed by the resistive vane. Furthermore, any microwave energy which is not absorbed by the vane 174 is reflected to the opposite end of the ferrite cylinder 172, where it is oriented so that it is absorbed by the other resistive vane 175.

Relating the structures of Figs. 6 and 7 to the circuit of Fig. 1, attention is directed to the circulators 41 and 42. Because the circulator 41 has two signal output wave guides, a circulator structure such as that shown in Fig. 6 is required. To instrument the circulator 42 of Fig. 1, however, in which only one signal output wave guide is required, an isolator such as that shown in Fig. 7 may be employed. The function indicated by the resistive terminations associated with circulator 42 would then be performed by the resistive vanes 174 and 175 of Fig. 7.

Referring again to circulator 41 in Fig. 1, it is interesting to note the effect of reversing the polarity of diode 45. Diode 45 would then be normally biased in the forward direction and would reflect microwave energy to wave guide 35. Upon the occurrence of a microwave pulse at input B, a positive pulse would be applied by detector 46 to bias diode 45 in the high resistance direction. This would switch the microwave output from wave guide 35 to wave guide 44. The foregoing example is given to illustrate one possible alternative form of microwave switching circuit which may be formed in accordance with the principles of the invention.

Circulators and isolators operating on the principles described above are disclosed in the following articles: "The Microwave Gyrator" by C. L. Hogan, Bell System Technical Journal, volume 31, pages 1 through 31, January 1952; and "Ferrites in Microwave Applications" by J. H. Rowen, Bell System Technical Journal, volume 32, pages 1333 to 1369, November 1953. The Rowen article also discloses some other nonreciprocal structures which may be employed as circulators or isolators.

Figure 8:
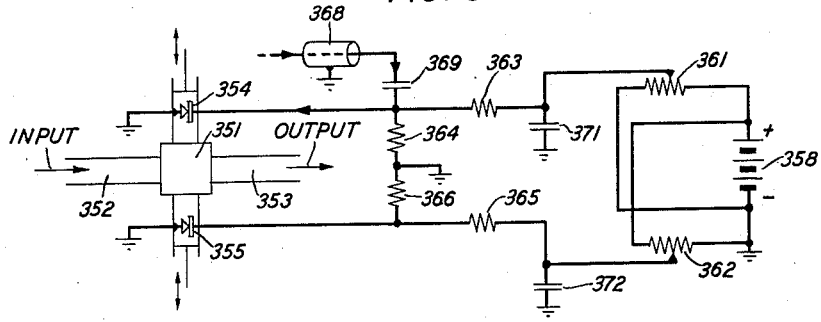
Fig. 8 illustrates a pulse modulation circuit which may be employed in the circuits of Figs. 1 and 3, for example.

In Figs. 1 and 3, the circuit arrangements for converting the output of the microwave oscillators 14, 15 into pulse form is shown schematically. One illustrative circuit which has been employed successfully is shown in Fig. 8. This circuit was employed with a ½" x 1" wave guide to pulse a microwave source operating at 11 kilomegacycles. In Fig. 8, the hybrid junction 351 has an input wave guide 352 and an output wave guide 353 coupled to one pair of conjugate arms. The two diodes 354 and 355 are located respectively in the other two arms of the hybrid junction.

The biasing circuits for the diodes 354 and 355 include the voltage source 358, the two potentiometers 361 and 362, and the resistance networks including resistors 363 and 364 associated with diode 354 and resistors 365 and 366 associated with diode 355. The coaxial line 368 supplies modulating pulses to the diode 354 through the coupling condenser 369.

The resistance networks serve to match the impedance of the coaxial line 368. With a 75 ohm coaxial line, the resistors 364 and 366 may be equal to 93 ohms, and resistors 363 and 365 may be equal to 390 ohms. The potentiometers 361 and 362 may have a resistance of 100 ohms. The crystals 354 and 355 may be type 1N78 diodes. The condensers 371 and 372 are provided to avoid the introduction of pulse signals into the voltage source 358, which may also supply bias to other electrical apparatus. It is to be understood of course that the foregoing specific circuit is disclosed merely to illustrate one workable circuit, and it is clear that other circuits could be provided to perform the same function.

Figure 9:
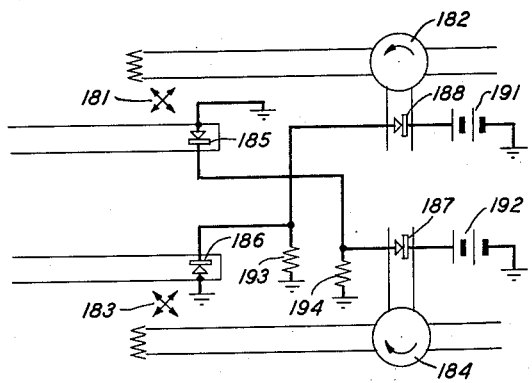
Fig. 9 illustrates the use of directional couplers and diode control circuits in accordance with an alternative version of the present invention.

Fig. 9 represents an alternative version of a portion of the circuit of Fig. 1. In Fig. 9 the directional coupler 181 corresponds generally to the hybrid junction 36 of Fig. 1, and the circulator 182 corresponds to the circulator 41 of Fig. 1. Similarly, the directional coupler 183 and the circulator 184 in Fig. 9 correspond to the hybrid junction 37 and the circulator 42 of Fig. 1. As in the circuit of Fig. 1, the detection diodes 185 and 186 control the impedance of the diodes 187 and 188, respectively. In connection with Fig. 9, however, the control circuits for the diode circuitry will be discussed in somewhat greater detail. Specifically, the sources of biasing voltage 191 and 192 bias the diode circuits in the reverse current direction. In addition, the resistors 193 and 194 are connected from ground to points between the two diodes in each control circuit. The presence of the resistors 193 and 194 reduces the impedance seen by the control diodes 185 and 186 and therefore greatly reduces their response time.

In switching circuits such as are described in the present application it is desirable that the microwave input to the detection diodes, such as diodes 185 and 186, be significantly greater than the microwave energy applied to the control diodes, such as diodes 187 and 188. This ensures positive action by the relatively large control pulses and avoids the adverse effects of self-bias by the control diodes which might occur if microwave signals of high intensities wtre applied to them. Thus, for example, the directional couplers 181 and 183 are designed to couple a minor fraction such as one-fourth to one-tenth of the input microwave energy to the circulators 182 and 184, respectively. In Fig. 1, much the same result may be secured by inserting attenuators before the circulators 41 and 42 to reduce the microwave signal level. Similarly, directional couplers or attenuators may be employed elsewhere in the circuits of Figs. 1 or 3 to ensure appropriate signal levels at the detection and control diodes.

While power levels at the various crystals are being considered, it should be mentioned that the same crystals should not necessarily be employed throughout the microwave system. At points where the available direct current pulses are relatively weak, a sensitive low power crystal should be employed. At such points, care must be taken to provide relatively low levels of microwave energy so that the switching action of the crystals will not be permanently impaired.

Figure 10:
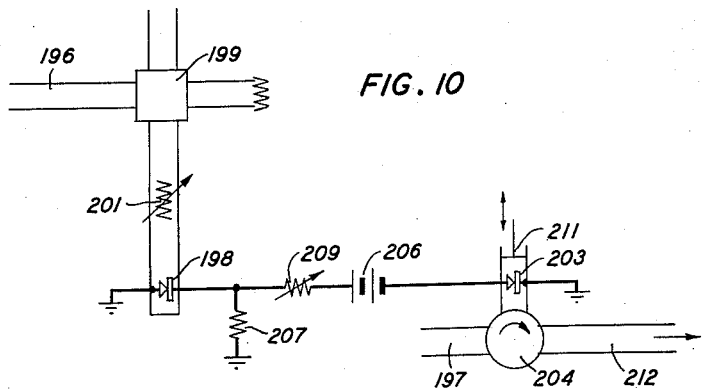
Fig. 10 shows a diode control circuit in which the control diode may be pulsed to an impedance state in which it matches the impedance of the wave guide in which it is located.

Fig. 10 is another microwave control circuit in which the biasing arrangements for the control and detection diodes are shown in some detail. In Fig. 10, input control signals are applied on wave guide 196 and the microwave energy to be controlled is applied to wave guide 197. The detection diode 198 is supplied with microwave signals from the hybrid junction 199 which is transmitted through the variable attenuator 201. The control diode 203 is located in a wave guide stub associated with the circulator 204. The diodes 198 and 203 are biased in the high resistance direction by the battery 206, which is located between the two diodes and is in series with them. The battery 206 is preferably a mercury cell which has sufficiently low impedance that pulses from the detection diode 198 are readily transmitted to the control diode 203. A resistor 207 is connected between ground and the ungrounded terminal of the diode 198 to reduce the impedance seen by it. In addition to the battery 206, a variable resistor 209 is connected in series with and between the two diodes 198 and 203.

The control diode 203 is normally biased in the high resistance direction. Under these conditions it offers little resistance to microwave energy transmission, and microwave energy is reflected from the plunger 211 to the output wave guide 212. When a microwave pulse is applied to wave guide 196 concurrently with the application of microwave energy to wave guide 197, however, the control diode 203 is biased in the low resistance sense. The magnitude of the pulse applied from detection diode 198 to the control diode 203 may be adjusted by varying the resistance of the attenuator 201 in the microwave circuit or that of the resistor 209 in the pulse circuit. The level of the pulses applied to diode 203 is adjusted so that the impedance of diode 203 matches that of the wave guide stub for a predetermined microwave input level on wave guide 197. Under these circumstances, the microwave energy is absorbed by the crystal and no microwave signals are coupled to output wave guide 212.

The diode 203 may be backed with a resistive termination instead of the plunger 211 in order to absorb microwave energy. With this arrangement, when the diode 203 is biased in the high resistance direction microwave energy would be transmitted past the diode and be absorbed in the termination. The amount of attenuation introduced by attenuator 201 and the variable resistance 209 would then be reduced so that pulses of greater magnitude would be applied to control diode 203 in the forward direction. With diode 203 biased in the extreme low resistance direction it would reflect microwave energy back to the circulator 204 and the microwave energy would be coupled to wave guide 212. The circuit associated with circular 204 may therefore be adjusted in a simple manner to interconnect wave guides 197 and 212, either in the presence or in the absence of microwave control pulses on wave guide 196.

In the various microwave switching circuits described above, microwave signals are detected by a first diode and are applied to another diode to control its impedance state. The control diode may for example be associated with a circulator as in Fig. 10, or with a hybrid junction as in Fig. 8, and also could be employed with other microwave circuits in which the change of impedance of a diode changes the characteristics of the microwave circuit. In the following description a number of circuits will be disclosed for controlling the impedance of a diode in a microwave circuit. In these circuits the detection diodes will be designated by the letter "D" and the control diodes will be designated by the letter "C."

Figure 11:
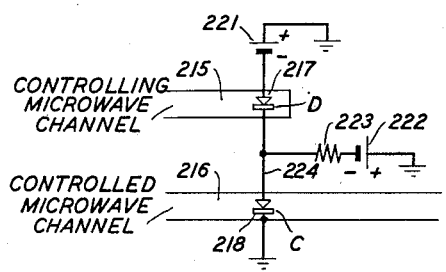
Fig. 11 is a diode control circuit diagram in which an additional biasing voltage source is employed.

In Fig. 11, microwave pulse signals are applied to the wave guide 215, and wave guide 216 is associated with a wave guide circuit which is to be controlled. In the absence of microwave signals applied to the wave guides 215 and 216 the detection diode 217 and the control diode 218 are biased in the high resistance direction. In the arrangement of Fig. 11 the voltage source 221 is connected in series with the diodes 217 and 218 and the voltage source 222 is connected in series with the resistor 223 from ground to a point between the two diodes. This arrangement provides a low input impedance for the detection diode 217 while concurrently ensuring back bias on both diodes. When microwave control signals are applied to wave guide 215, a positive voltage is developed on lead 224 and is applied to the control diode 218. This changes the impedance of the control diode 218 from the high resistance to the low resistance state. It then performs any of the switching or control functions described in connection with Figs. 9 and 10, for example, in which diodes 187 and 211 are the control diodes. By making the magnitude of the battery 221 slightly greater than the battery 222, a reverse bias is applied to detector 217 which prevents detector action until a predetermined signal level is obtained. This has the effect of suppressing low level noise and distortion effects on wave guide 215.

Figure 12:
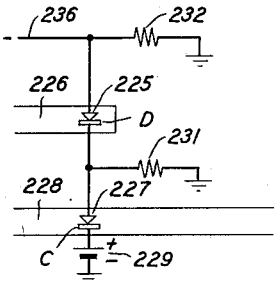
Fig. 12 shows a wave guide circuit in which the impedance state of the control diode may be changed either in response to microwave input signals or in response to direct current pulses.

The operation of the circuit of Fig. 12 is similar to that of the individual control circuits of Fig. 9. In Fig. 12, microwave control signals are applied to diode 225 on wave guide 226. The control diode 227 is located in the wave guide 228. The biasing source 229 and the resistor 231 perform the functions described above in connection with the corresponding elements 192 and 194 in the circuit of Fig. 9. In addition to the elements set forth above, which are similar to those of the control circuits of Fig. 9, however, the resistor 232 is connected in series with the diode 225. A source of positive direct current pulses which is synchronized with the microwave pulses applied to wave guides 226 and 228 is also connected to a point between resistor 232 and the detection diode 225 by lead 236. The application of positive direct current pulses to lead 236 or microwave pulses to wave guide 226 tends to bias both the detection and the control diodes 225 and 227 in the low resistance direction. Depending on the drive applied to lead 236 and wave guide 226 and the magnitude of the biasing voltage 229, the diode 227 can be driven from the high resistance to the low resistance state in the presence of either a pulse or lead 236 or a microwave pulse on wave guide 226. Alternatively, the magnitude of the biasing source 229 can be increased and the drive applied to lead 236 and wave guide 226 may be reduced so that pulses are required on both lead 236 and wave guide 226 to drive diode 227 to the low resistance state. When the control diode 227 changes impedance state upon the application of pulses either on lead 236 or on wave guide 226 the circuit constitutes an Or gate. With voltage levels arranged so that diode 227 does not conduct except when pulses are present on both lead 236 and wave guide 226 the circuit constitutes an And gate.

Figure 13:
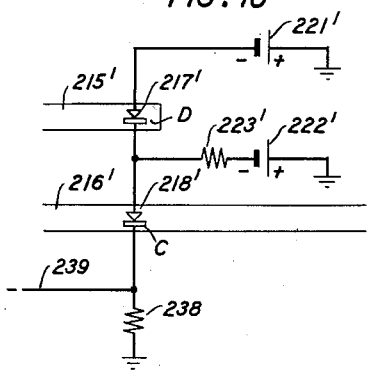
Fig. 13 is an alternative version of the circuit of Fig. 12.

The circuit of Fig. 13 is essentially the same as the circuit of Fig. 11 with the addition of a direct current pulse input. In Fig. 13 the reference numerals of elements corresponding to those of Fig. 11 have been reproduced with the addition of a prime symbol. Thus, the elements 215', 216', 217', 218', 222' and 223' perform the same functions as the corresponding unprimed elements in Fig. 11. In Fig. 13, however, the resistor 238 is connected between the control diode 218' and ground. In addition, a source (not shown) of negative direct current pulses which are synchronized with the microwave pulses applied to wave guide 215' is connected by lead 239 to a point between resistor 238 and diode 218'. The application of a negative control pulse on the cathode side of the control diode 218' has the same effect as the application of a positive control pulse on the anode side of diode 225 in Fig. 12. Accordingly, the circuit of Fig. 13 operates in substantially the same manner as the circuit of Fig. 12, and Fig. 13 may be operated either as an Or circuit or as an And circuit in accordance with the magnitude of the control signals and biasing sources.

The circuits of Figs. 14 and 15 are patterned closely after the circuits of Figs. 12 and 13. However, in each of the circuits of Figs. 14 and 15 an additional control wave guide and another detection diode are employed. Thus, for example, in Fig. 14 two detection diodes 241 and 242 are connected in series with the control diode 243, and in Fig. 15 the two detection diodes 247 and 248 are connected in series with the control diode 249. The polarity of the direct current pulses and the biasing sources in the circuits of Figs. 14 and 15 are the same as in the corresponding circuits of Figs. 12 and 13, respectively. In accordance with the relative magnitudes of the control signals and biases, the circuits of Figs. 14 and 15 may either be Or circuits or And circuits, or they may be adjusted to respond to the presence of two signals out of the three possible input signals.

In Figs. 12 and 14, the direct current pulses have been disclosed as being of positive polarity in order to augment the action of the detection diodes. Similarly, in Figs. 13 and 15, the direct current control pulses have been disclosed as being of negative polarity in order to augment the effect of the detection diodes in biasing the control diodes in the low resistance direction. By reversing the polarity of the direct current pulses in the embodiments of Figs. 12 and 13, and appropriately adjusting the bias voltages, inhibiting action may be obtained. When the polarity of the direct current pulses is reversed they act to increase the bias of the control crystals in the reverse current direction rather than to change the impedance state of the control crystals. With this arrangement microwave control signals applied to the detection diodes will reverse the state of the control diodes in the absence of direct current pulses. However, when inhibiting direct current pulses are present either alone or concurrently with microwave pulses no change of the impedance state of the control diodes is produced. Similarly, when negative direct current pulses of sufficiently large magnitude are applied in the circuit of Fig. 14 or when positive direct current pulses are employed in the circuit of Fig. 15 they may override the effect of microwave signals applied to the detection diodes, and inhibiting action may be obtained.

In the circuit of Fig. 16 another inhibiting circuit is disclosed. In Fig. 16 the inhibiting input wave guide channel 251 is provided with a detection diode 252. The normal microwave control wave guide 253 is provided with a detection diode 254. The control diode 255 in wave guide 256 is poled in the same direction as diode 254, and all three diodes are connected in series. The diode 252 is, however, poled in opposition to diodes 254 and 255. The voltage source 258 is provided to normally bias the control diode 255 in the high resistance direction. The usual resistors 261 and 262 are connected between ground and the connections between the diodes. When microwave signals are applied to the wave guide 253 the positive voltage developed by diode 254 overcomes the reverse current bias provided by voltage source 258 and the control diode 255 is switched to its low impedance state. When pulse signals are simultaneously applied to wave guide 251, however, the control voltage developed by diode 252 acts in opposition to that developed by diode 254. Accordingly, the impedance state of control diode 255 is changed only when wave guide 253 is energized and when the inhibiting wave guide channel 251 is not energized.

In Fig. 17, a somewhat different arrangement is presented. Specifically, the detection diode 271 in wave guide 272 is connected in parallel with the control diode 273 in wave guide 274. Current is supplied to the two diodes in parallel by the circuit including the voltage source 275 and the large variable resistance 276, or by another suitable constant current source. An additional voltage source 277 is connected between the control diode 273 and ground. Because the cathode terminal of the control diode 273 is at a lower potential than the corresponding electrode of diode 271, the control diode 273 normally assumes the low resistance state. Under these circumstances, lead 279 interconnecting the anode electrodes of diodes 271 and 273 assumes the negative potential provided by voltage source 277. The detection diode 271 is therefore biased in the reverse current direction in the absence of signals applied to wave guide 272. In one arrangement the variable resistance 276 is adjusted so that the impedance of diode 273 matches that of the wave guide 274 when the guide is provided with a shorting piston (not shown). Under these circumstances, substantially all of the energy applied to wave guide 274 is absorbed by the control diode 273. When microwave energy is applied to wave guide 272, however, the diode 271 conducts. Under these circumstances, a significant amount of the current supplied by the circuit including resistor 276 and voltage source 275 is diverted to ground through diode 271. With the amount of current applied to the control diode 273 being significantly reduced, its impedance no longer matches that of the wave guide 274. By increasing the microwave energy applied to wave guide 272 sufficiently, the potential of the lead 279 may attain a substantial negative value. When sufficient drive is applied to wave guide 272, the negative potential on lead 279 will exceed that of the biasing source 277 and the control diode 273 will actually be biased in the high impedance state.

In another arrangement with no plunger in wave guide 274 of Fig. 17, the variable resistance 276 may be adjusted to increase the forward current through diode 273 so that it reflects microwave energy. When diode 273 is driven to the high resistance state by the action of diode 271 as described above, microwave energy is freely transmitted past crystal 273.

Fig. 18 is a more complete showing of a microwave logic circuit which is patterned after that of Fig. 17. In Fig. 18, two detection diodes 281 and 282 are located respectively in wave guides 283 and 284. The control diode 285 is located in a wave guide stub 286. In Fig. 18, the voltage sources 287 and 288 and the variable resistance 289 perform the same functions as the corresponding elements 275 through 277 of Fig. 17. To indicate how the wave guides 283, 284, and 286 may be incorporated into a wave guide system, certain additional circuitry is included in the showing of Fig. 18. Specifically, the wave guide stub 286 is associated with the circulator 291, and three microwave pulse sources 292, 293, and 294 supply microwave energy to the wave guide 283, the wave guide 284, and the circulator 291, respectively. The microwave pulse signals from the three pulse sources 292 through 294 are synchronized by the timing pulses from the synchronizing pulse source 295. In the circuit of Fig. 18, the synchronizing pulse source 295 corresponds to the pulse source 13 shown in Fig. 1. Similarly, each of the microwave pulse sources 292, 293, and 294 includes the microwave circuitry required for generating pulse trains. This may, for example, include components such as the word generator 11, the microwave oscillator 14, the hybrid junction 19, and the associated elements indicated in Fig. 1. Alternatively, each of the microwave sources may include means for generating two or more pulse trains of different microwave frequencies and for applying them to the individual wave guide associated with each pulse source.

Under normal circumstances, in the absence of microwave pulses on wave guides 283 and 284, the control diode 285 is biased to match the impedance of the wave guide stub 286. Under these conditions, energy applied to the circulator 291 from the microwave pulse source 294 is absorbed in wave guide stub 286 and is not coupled to the output wave guide 297. When a microwave pulse is applied to wave guides 283 or 284, one of the detection diodes 281 or 282 becomes conducting. As discussed above, with sufficient microwave energy applied to wave guides 283 or 284, control diode 285 is biased to the high resistance state. With control diode 285 in the high resistance state, energy is reflected from the end of the wave guide stub 286 back to the circulator 291 and is coupled to the output wave guide 297. Microwave signals applied to the circulator 291 are therefore transmitted to the output wave guide 297 when either or both of the wave guides 283 and 284 are supplied with microwave pulses.

The circuit of Fig. 19 constitutes a microwave pulse regenerator. From an over-all standpoint, the circuit of Fig. 19 operates to regenerate microwave pulses supplied by the microwave pulse generator 301 to the wave guide 302. The regenerated microwave output pulses appear at output wave guide 303 in accordance with negative control pulses which are supplied from the word generator 304 on lead 305. The pulse generation circuitry also includes the synchronizing pulse source 307, which supplies pulses to the word generators 304 and 308. Microwave pulse trains developed in the pulse generator 301 are applied to the amplifier 309 and are ultimately coupled through the isolator 310 to the wave guide 302. The detection diode 312 is located at the end of wave guide 302. A control diode 314 is located in wave guide stub 315 associated with the circulator 316. Microwave energy from the oscillator 317 is coupled to the wave guide stub 315 by the circulator 316. Under normal conditions, the control diode 314 is biased to match the impedance of wave guide stub 315 by the voltage source 318 and the variable resistance 319. The detection diode 312 is normally biased in the reverse current direction by the voltage source 321 which is applied to it through resistor 322. Negative timing pulses are applied to the circuit between resistor 322 and diode 312 on lead 305 from the word generator 304. These pulses may, for example, occur in successive digit periods and may therefore be designated "clock" pulses. The negative pulses on lead 305 are in opposition to the positive bias provided by the voltage source 321, but normally do not overcome this bias. When microwave pulses are applied to detection diode 312 on wave guide 302, however, the additional positive current provided by rectification action drives diode 312 into the low resistance state. Under these circumstances, current from the network including voltage source 318 and the resistor 319 is diverted through diode 312, and the control diode 314 is driven to the high resistance state. The diode 314 no longer absorbs microwave energy and the signals are reflected to the circulator 316 where they are coupled to the output wave guide 303. The relative magnitudes of the bias provided by battery 321, the rectified output from diode 312, and the negative pulses applied on lead 305 are such that low level microwave signals which may be due to noise or distortion, for example, do not drive the diode 312 into its low resistance state. A significant pulse is required to accomplish this change of state of the diode 312. Under these conditions, once control diode 314 has attained a high resistance state, additional drive on detection diode 312 will not vary the amount of microwave energy reflected from the control diode. Accordingly, distorted or sloppy pulses applied to wave guide 302 are properly timed, and appear in fully regenerated form at the output wave guide 303.

Fig. 20 is a logic circuit in which additional diodes are employed to improve the switching action and to facilitate the application of control signals. In Fig. 20, input wave guides 331 and 332 are provided with detection diodes 333 and 334, respectively. The control diode 335 is located in wave guide 336. The biasing source 340 normally biases the control diode 35 in the high resistance direction. Additional circuits are connected from the lead between the two detection diodes to ground and from the lead interconnecting the detection diode 334 and the control diode 335 to ground. The first of these circuits includes the series connection of a diode 337, a resistor 338, and a negative source of voltage 339. The second circuit includes the diode 341, the resistor 342, and the negative source of voltage 343. Sources of direct current pulses are connected to these additional circuits between the resistors and the diodes. A first source of positive control pulses is connected by lead 344 to a point between diode 337 and resistor 338, and the second source of positive control pulses is connected by lead 345 to a point between diode 341 and resistor 342.

Under normal conditions, in the absence of the control pulses on leads 344 and 345, the diodes 337 and 341 are biased in the low resistance sense. When diode 341 is in the low resistance state, an additional reverse bias is supplied to the control diode 335 by voltage source 343 to augment the back-bias of the voltage source 340. Under these conditions, the presence of microwave signals applied to wave guide 331 or 332 cannot bias the diode 335 to the high resistance state. This action is prevented by the effective shorting out of the positive rectified output from detection diodes 333 and 334 through the circuit including diode 341, resistor 342 and voltage source 343. In a similar manner, the circuit including the diode 337, resistor 338 and voltage source 339 effectively shorts out the positive rectified output of the detection crystal 333. Furthermore, any positive pulses which may be applied to lead 347 is also shorted out to ground by the circuit including diode 337.

The application of suitable direct current or unidirectional pulses to leads 344 and 345 changes the impedance of diodes 337 and 341 to the high impedance state. When microwave energy is applied to wave guides 331 and 332 with diodes 337 and 341 in the high impedance state, the positive detected output pulses are applied directly to control diode 335. The diode 335 is then switched to the low impedance state as though the additional control circuits were not present.

As stated before, when diode 341 is in the low impedance state, pulses applied to lead 347 or developed by diodes 333 or 334 are effectively shorted out. This is true whether diode 337 is in the high or low impedance state. When diode 341 is in the high impedance state, a pulse developed by detection action by detection diode 334 can change the impedance state of the control diode 335 irrespective of the impedance state of diode 337. However, when diode 341 is in the high impedance state and diode 337 is in the low impedance state, the application of microwave pulses on wave guide 331 or the application of direct current pulses on lead 347 does not affect the impedance state of the control diode 335.

It is to be understood that the above-described arrangements are illustrative of the application of the principles of the invention. Numerous other arrangements, such as the application of detected pulses to more than one control diode, may be devised by those skilled in the art without departing from the spirit and scope of the invention.

What is claimed is:

1. In a microwave pulse logic circuit, a wave guide switching unit including an input branch wave guide and an output branch wave guide, a first source of electromagnetic wave energy for applying trains of pulses at a pulse timing repetition rate greater than 25,000,000 pulses per second to said input wave guide, a control branch wave guide, means connecting said control branch wave guide to said switching unit for coupling energy applied to said input branch to said output branch when said control branch has a first preassigned impedance but not when it has a second preassigned impedance, a diode coupled to said control branch wave guide for controlling its impedance, a detector connected to said diode for switching the impedance of said control branch between said first preassigned impedance and said second preassigned impedance, a wave guide connected to said detector, a second source of electromagnetic wave energy for applying different trains of pulses to said last-mentioned wave guide, and means for synchronizing the timing of individual pulses in the pulse trains from said first and second pulse sources.

2. A circuit as defined in claim 1 wherein said switching unit is a hybrid junction.

3. A circuit as defined in claim 1 wherein said switching unit is a circulator.

4. A microwave data processing circuit comprising a wave guide logic circuit having at least three input wave guides and at least one output wave guide, a storage delay circuit including a pulse regenerator connected between said output wave guide and one of said input wave guides, means for applying digital information in the form of pulses of microwave energy at a pulse timing repetition rate greater than 25,000,000 pulses per second to another input wave guide of said logic circuit, additional means for applying different digital information in the form of pulses of microwave energy to the other input wave guide of said logic circuit, and means for synchronizing the timing of the individual pulses of the digital information applied to said input wave guides.

5. A microwave data processing circuit comprising a wave guide logic circuit having at least two input wave guides and at least one output wave guide, a storage delay circuit means including a pulse regenerator connected between said output wave guide and one of said input wave guides for amplifying microwave pulses circulating in said storage delay circuit means, and means for applying digital information in the form of pulses of microwave energy to another input wave guide of said logic circuit.

6. In a microwave pulse logic circuit, a wave guide switching unit including an input branch wave guide and an output branch wave guide, a first source of electromagnetic wave pulses connected to said input wave guide, means including an assymmetrically conducting device coupled to said switching unit for blocking said electromagnetic wave pulses when said device is in a first preassigned impedance state and for transmitting said pulses to said output wave guide when said device has a second preassigned impedance, an additional wave guide, a second source of electromagnetic wave pulses connected to said additional wave guide, and means responsive to the presence of electromagnetic wave pulses in said additional wave guide for switching the impedance of said asymmetrically conducting device from one of its preassigned impedance states to the other preassigned impedance state.

7. In a microwave pulse logic circuit, a wave guide switching unit including an input branch wave guide and an output branch wave guide, a first source of electromagnetic wave pulses having a pulse timing repetition rate greater than 25,000,000 pulses per second connected to said input wave guide, a control wave guide, means connecting said control wave guide to said switching unit for blocking electromagnetic wave pulses from said output wave guide when said control wave guide has a first preassigned impedance and for transmitting said pulses to said output wave guide when said control branch has a second preassigned impedance, an assymmetrically conducting device coupled to said control branch wave guide for controlling its impedance, an additional wave guide, a second source of electromagnetic wave pulses connected to said additional wave guide, means for synchronizing the timing of pulses from said first and second pulse sources, and means responsive to the presence of electromagnetic wave pulses in said additional wave guide for controlling the impedance of said asymmetrically conducting device and switching the impedance of said control wave guide from one of its preassigned impedance states to the other preassigned impedance state.

8. In a microwave pulse logic circuit, a wave guide switching unit including an input branch wave guide and an output branch wave guide, a first source of electromagnetic wave pulses connected to said input wave guide, a control wave guide, means connecting said control wave guide to said switching unit for blocking electromagnetic wave pulses from said output wave guide when said control wave guide has a first preassigned impedance and for transmitting said pulses to said output wave guide when said control wave guide has a second preassigned impedance, an asymmetrically conducting device coupled to said control wave guide for controlling its impedance, an additional wave guide, a second source of electromagnetic wave pulses connected to said additional wave guide, means responsive to the presence of electromagnetic wave pulses in said additional wave guide for controlling the impedance of said asymmetrically conducting device and switching the impedance of said control wave guide from one of said preassigned impedance states to the other of said preassigned impedance states, and means for selectively coupling microwave signals in said additional wave guide to said output wave guide.

9. In a microwave pulse logic circuit, a wave guide switching unit including an input branch wave guide and an output branch wave guide, a first source of electromagnetic wave pulses connected to said input wave guide, a control wave guide, means connecting said control wave guide to said switching unit for blocking electromagnetic wave pulses from said output wave guide when said control wave guide has a first preassigned impedance and for transmitting said pulses to said output wave guide when said control wave guide has a second preassigned impedance, an asymmetrically conducting device coupled to said control wave guide for controlling its impedance, a detector connected to said diode for switching the impedance of said control wave guide between said first preassigned impedance and said second preassigned impedance, a wave guide connected to supply energy to said detector, and a second source of electromagnetic wave pulses connected to said last-mentioned wave guide.

10. In a microwave pulse logic circuit, a wave guide switching unit including an input branch wave guide and an output branch wave guide, a first source of electromagnetic wave energy for applying trains of pulses to said input wave guide, means including an asymmetrically conducting device coupled to said switching unit for blocking said electromagnetic wave pulses when said device is in a first preassigned impedance state and for transmitting said pulses to said output wave guide when said device has a second preassigned impedance, an additional wave guide, a second source of electromagnetic wave energy for applying different trains of pulses to said last-mentioned wave guide, means for synchronizing the timing of individual pulses in the pulse trains from said first and second pulse sources, and means responsive to the presence of electromagnetic wave pulses in said additional wave guide for switching the impedance of said asymmetrically conducting device from one of its preassigned impedance states to the other preassigned impedance state.

11. A microwave adder circuit comprising a sum output wave guide, a carry output wave guide, first and second binary signal input wave guides, a carry input wave guide coupled to said carry output wave guide, a first microwave branching circuit connecting said first binary signal input wave guide to said sum and said carry output wave guides, a second microwave branching circuit connecting said second binary signal input wave guide to said sum and carry output wave guides, a third microwave branching circuit connecting said carry input circuit to said sum and carry output wave guides, means including at least two control diodes associated with each branching circuit for blocking the input microwave signals or applying them to either the sum or carry output wave guides, and a detector coupled to each of said input wave guides and connected to apply control voltages to the diodes associated with each of the branching circuits connected to the other two input wave guides.

12. In a microwave pulse logic circuit, first and second input wave guides, a first source of electromagnetic wave energy for applying trains of pulses to said first input wave guide, a second source of electromagnetic wave energy for applying different trains of pulses to said second input wave guide, means for synchronizing the timing of individual pulses in the pulse trains from said first and second pulse sources, a microwave switching circuit including input and output wave guides and at least one control diode, and means responsive to the pulse trains in said wave guides for controlling the transmission of microwave energy through said switching circuit by changing the impedance of said diode.

13. In combination, a microwave circulator, a first input wave guide coupled to a first arm of said circulator, a control diode connected to a second arm of said circulator, a detection diode connected to a third arm of said circulator, a second input wave guide independent of said first input wave guide, a detector coupled to said second wave guide and connected to apply direct current control pulses to said control diode, a microwave switching circuit including an additional control diode, and means for applying signals from the detection diode associated with said circulator to said additional control diode.

14. In combination, first and second wave guides, first and second diodes located respectively in said first and second wave guides, means for controlling the impedance state of said second diode in accordance with the rectified output of said first diode, and means including an additional diode for controlling the operation of at least one of said first two diodes.

15. A combination as defined in claim 14 wherein said control means including an additional diode is connected to a lead which interconnects said first and second diodes.

16. A combination as defined in claim 14 wherein said additional diode is connected in series with said first and second diodes.

17. A combination as defined in claim 14 wherein said additional diode is connected in parallel with said first and second diodes.

18. In combination, two wave guides, means for applying different pulse trains to said two wave guides, two diodes located respectively in said two wave guides, a third diode connected to said first two diodes, and means for applying another train of pulses to said third diode.

19. A combination as defined in claim 18 wherein an additional wave guide is provided and said third diode is located in said additional wave guide.

20. A combination as defined in claim 18 wherein all three diodes are connected to a common point.

21. A combination as defined in claim 18 wherein said three diodes are connected in series.

22. A combination as defined in claim 21 wherein said three diodes are poled in the same direction.

23. A combination as defined in claim 21 wherein one of said three diodes is poled in the opposite direction with respect to the other two diodes.

24. In a microwave data processing circuit, first and second input channels for binary input information, means for applying microwave energy to said first channel to represent binary signals, means for applying microwave energy to said second channel to represent binary signals, means for controlling said two microwave energy application, means to produce distinctly different trains of digital information on said two channels, means connected to said first and second channels to produce an output signal only upon the occurrence of microwave signals from said two channels representing a preassigned combination of binary digits, and an additional means connected to said first and second channels to produce an output signal upon the occurrence of microwave signals representing a different combination of binary digits.

25. In a microwave data processing circuit, first and second microwave channels, means for applying different trains of binary signals to said first and second microwave channels, detection means coupled to said first channel, a microwave switching component coupled to said second channel, and means for controlling the state of said switching component in accordance with the detected output signals from said detection means.

26. A microwave logic system comprising a first wave guide, a microwave component in said wave guide, means for applying microwave logic signals to said first wave guide for transmission through said component, a second wave guide connected to said component, a control diode in said second wave guide, means for biasing said control diode to one impedance state to determine a normal transmission capability of said component, a third wave guide, a detector diode in said third wave guide, means applying microwave energy to said third wave guide, and means connecting said detector diode to said control diode to bias said control diode to a second impedance state to change the transmission capability of said component in accordance with said microwave energy in said third wave guide.

27. In a microwave data processing circuit, first and second input channels for digital input information, means for applying microwave energy to said first channel to represent digital signals at a digit repetition rate of greater than 25,000,000 digits per second, means for applying microwave energy to said second channel to represent digital signals also at a digit repetition rate of greater than 25,000,000 digits per second, means for controlling said two microwave energy application means to produce distinctly different trains of digital information on said two channels, means connected to said first and second channels to produce an output signal only upon the occurrence of microwave signals from said two channels representing a preassigned combination of digits, and additional means connected to said first and second channels to produce an output signal upon the occurrence of microwave signals representing a different combination of digits.

28. A data processing circuit as defined in claim 27 wherein means are provided for coupling output signals back to one of said input channels, and wherein said coupling means includes a microwave digit regeneration circuit.

29. A combination as defined in claim 28 wherein each of said output signal producing means includes a detection diode coupled to one input channel, a control diode coupled to the other channel, and a transmission circuit for detected pulses interconnecting said two diodes.

30. A microwave data processing circuit comprising first and second microwave channels for carrying digital information, said channels including first and second control means respectively, means for applying microwave energy to each of said first and second channels, first means for generating pulses representing digital signals, second means for generating pulses representing digital signals, and means for synchronizing said first and second pulse-generating means, said first and second pulse-generating means being respectively coupled to said first and second control means, whereby the impedance levels of said first and second control means are respectively varied in accordance with the outputs of said first and second pulse-generating means, thereby to modulate in synchronism the outputs of said first and second microwave-applying means.

31. A microwave data processing circuit as in claim 30 wherein each of said first and second control means includes an asymmetrically conducting device.

32. A microwave data processing circuit as in claim 30 wherein each of said first and second generating means includes a direct current pulse-generating circuit.

References Cited in the file of this patent

UNITED STATES PATENTS

| | | |
|---|---|---|
| 2,531,447 | Lewis | Nov. 28, 1950 |
| 2,593,113 | Cutler | Apr. 15, 1952 |
| 2,691,727 | Lair | Oct. 12, 1954 |
| 2,693,907 | Tootill | Nov. 9, 1954 |
| 2,723,377 | Cohn | Nov. 8, 1955 |
| 2,758,787 | Felker | Aug. 14, 1956 |
| 2,758,788 | Yaeger | Aug. 14, 1956 |
| 2,781,968 | Chenus | Feb. 19, 1957 |